(12) United States Patent
Cahill et al.

(10) Patent No.: US 7,266,570 B2
(45) Date of Patent: Sep. 4, 2007

(54) SYSTEM AND METHOD FOR EXPORTING FORMATTED TRANSACTIONAL DATA FROM A DATABASE SYSTEM

(75) Inventors: Des Cahill, Kildare (IE); Declan Ryan, Wicklow (IE); Mairead Lyons, Dublin (IE)

(73) Assignee: Deecal International Limited (IE)

( * ) Notice: Subject to any disclaimer, the term of this patent is extended or adjusted under 35 U.S.C. 154(b) by 408 days.

(21) Appl. No.: 10/828,963

(22) Filed: Apr. 21, 2004

(65) Prior Publication Data

US 2005/0240630 A1   Oct. 27, 2005

(51) Int. Cl.
G06F 17/30 (2006.01)

(52) U.S. Cl. ...................... 707/200; 707/100

(58) Field of Classification Search .............. 707/1–10, 707/100, 200
See application file for complete search history.

(56) References Cited

U.S. PATENT DOCUMENTS 5,448,739 A * 9/1995 Jacobson .................... 719/320
6,289,382 B1 * 9/2001 Bowman-Amuah ......... 709/226

* cited by examiner

*Primary Examiner*—Wilson Lee
(74) *Attorney, Agent, or Firm*—Seyfarth Shaw LLP; Brian L. Michaelis

(57) ABSTRACT

A database and data processing system for transactional and other data allows such data to be exported in various different formats as required by other systems. As an example, the exported data can be loaded into a business's general ledger. Data can be exported in different formats, quite flexibly with easy setup of new and different export data formats for different systems.

19 Claims, 7 Drawing Sheets

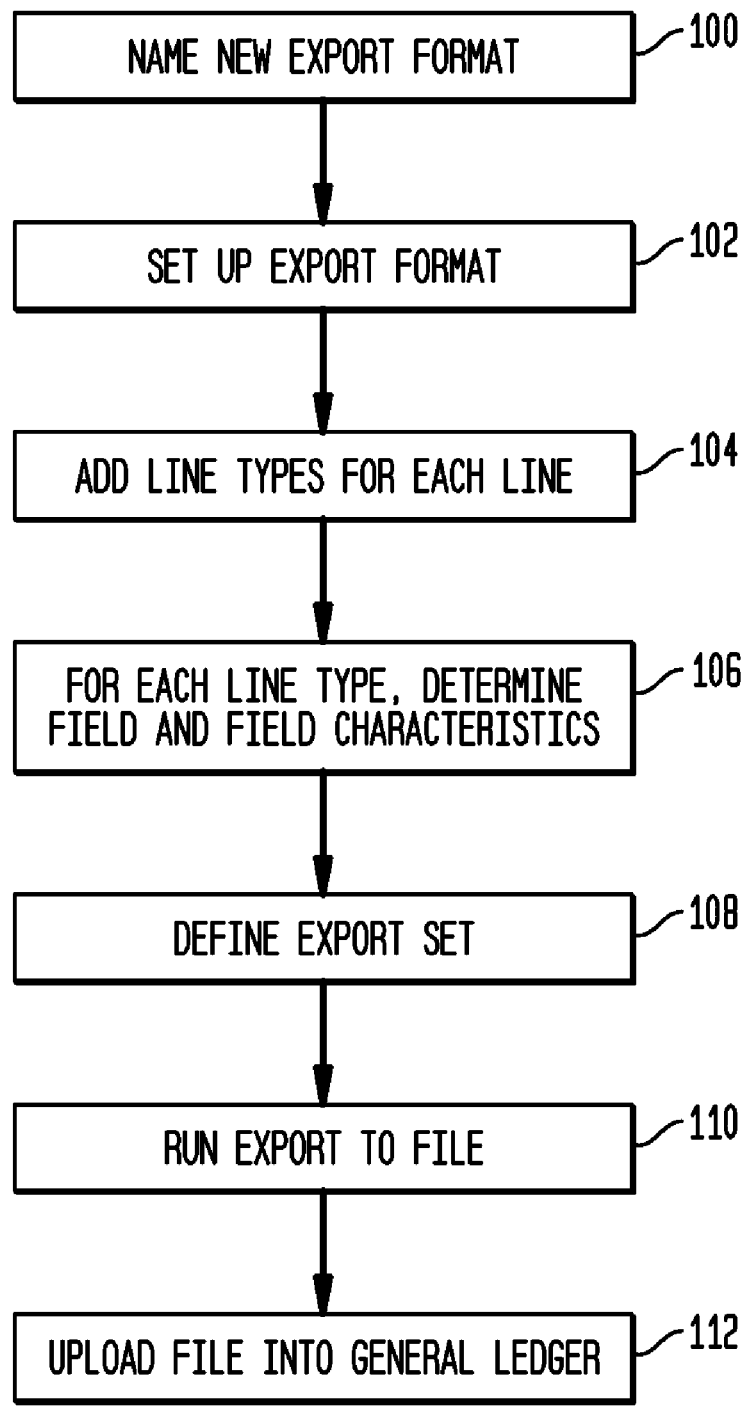

1 EXPORT FORMAT PROCESS FLOW

FIG. 5

SYSTEM AND METHOD FOR EXPORTING FORMATTED TRANSACTIONAL DATA FROM A DATABASE SYSTEM

FIELD OF THE INVENTION

This invention is directed towards data processing, and more particularly towards transactional data processing and formatting for input into other systems and ledgers.

BACKGROUND

Online transactions are becoming more prevalent. Similarly, online processing of transaction data is very common. One area with large amounts of transaction data is credit cards and debit cards. Data from all such credit cards transactions is handled electronically, which allows faster transmission of such data, but also comes with its own set of problems.

One area of credit card use is the issuing of cards and accounts to employees or agents of a company. The employee can then use the corporate card to charge all types of expenses related to their job with the company. These payments are often collectively referred to as "travel and entertainment" (T&E) expenditure and typically include hotels, meals, taxis, airline tickets etc. For example an employee who travels frequently on business would have a credit card to charge all the employee's travel related expenses. The employee then does not need to submit expense reimbursement reports for all their travel expenses, but have the credit card statement processed directly by the company. Employees may have several different corporate cards, each for a different purpose.

This great expansion of company-issued credit cards has caused a consequential increase in the company's accounting issues in handling these transactions. Statements from the credit card issuers must be processed by an accounting department, and expenses properly charged to the proper department or account within the company. The amount of transaction data, the complexity of the data, and the complexity of the company pay structure all create problems.

One problem is that although statements and transaction data from the credit card issuers is available in electronic format for easy access, each credit card issuer supplies such transaction data in a different format. There is no set industry standard for formatting of transaction data. Therefore the preliminary processing of transaction data requires different processing based on the format of the data. This limits a company's ability to automatically process the data, and may limit the company's choice of credit card issuers or the providers of the transaction data. The other choice is for a company to enter certain transaction data by hand, or spend time and money to develop preliminary processing applications to handle the different formats of received transaction data. Further, as new formats for transaction data are introduced, or older formats are updated, the data preliminary processing application must be updated.

A similar problem exists on the opposite side: transaction data that is to be exported from the database will be used by a variety of other applications. An example is general ledger systems used by businesses. There are a great number of different ledger products on the market, and as is typical, they each expect entries in a different format. Some example of ledger products are SAP, J D Edwards, Walker, Lawson, Coda, and Oracle Financials, etc. These examples are widely available standard ledger products. There are also many large businesses with their own custom built or modified ledger systems, with their own peculiar format requirements.

All these different ledger formats limit a system's ability to automatically export data to a ledger, and may limit the company's choice of what ledger systems can be used. Many businesses simply enter the data into the ledger by hand. The other choice is for a company to spend time and money to develop proprietary export functionality to handle the different formats for one or more ledgers. This also ties a company down to a certain ledger system because of the increased time and expense for change to a new system.

Ledger input is also very demanding. Many of the ledger systems require data in rigid spacing formats with fixed field lengths. They can not handle other formats, such as variable length fields, comma delimited fields, or other simplified data acquisition formats. This problem also limits the ability for a business to use a ledger format different from the one it already uses.

SUMMARY

The present invention provides for customized export files for direct import to a business general ledger including exports to SAP, J D Edwards, Walker, Lawson, Coda, Oracle Financials and others, thus reducing the cost overhead of manual entry. Users can export transaction from the system in the correct format for upload into any general ledger accounting software system. Users can set up and save export details that can be used multiple times to run export sessions.

Export formats according to the present invention describe the output layout of an export file. Export formats can be created from a defined list of line types. These general types each have corresponding properties. Each line type is made up of export fields that can be grouped and moved in sequence to create the export format files. Each export field has properties that can be set at a global (i.e. for this particular export) or individual field level. There are three general field types—amount, date and text.

In an illustrative embodiment, line types include File Header, Transaction Header, Transactions—Top Line or Line Item, Tax Detail, Tax Summary, Opposite Entry Detail, Opposite Entry Summary, and File Trailer. Other different or new line types may be added and are part of the present invention.

An advantage of the present invention includes providing customized export files to different Enterprise Resource Planning (ERP) and general ledger systems implemented at any level of a business or company. The present invention is directed towards a transaction processing system that is very easy to adapt and modify based on the requirements of companies and users. Embodiments of the present invention can easily accept transaction data in various formats, and can quickly be updated for new or changed formats. Transaction data can be processed quickly and different parties and departments can access the data, and also export the data in a format unique to the requirements of the data accessor. Also, the present invention provides common transaction data representation across data processors.

The present invention provides unprecedented flexibility in the importing, processing and accessing of commercial card data. The system provides simple and secure access to all services from a web browser, including card transactions, eStatement browsing and history navigation, instant on-line management information with downloadable reports, automatic cost allocation at line item level regardless of complexity, and customized file exports which can be downloaded in a format that will load into a company's specific general ledger. Further, the system also provides automatic validation of transactions for VISA tax rule compliance or other national or jurisdictional or credit card processing rules; and generation of evidence and non-evidence for tax reports, all on-line. The system also handles multinational program management including consolidated reports, international tax administration and centralized or decentralized program management, as well as multiple languages and multiple currencies.

Further advantages of the present invention include the ability to export data for general analysis purposes, as opposed to just specifically for posting to ledger. An export file can be run according to the invention in different export formats for different entities or levels of an organization.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 4A is a flow chart of steps to set up and export data according to the present invention;

FIG. 5 is a display screen from an illustrative embodiment showing a user interface for creating an export format.

DETAILED DESCRIPTION

Figure 1:
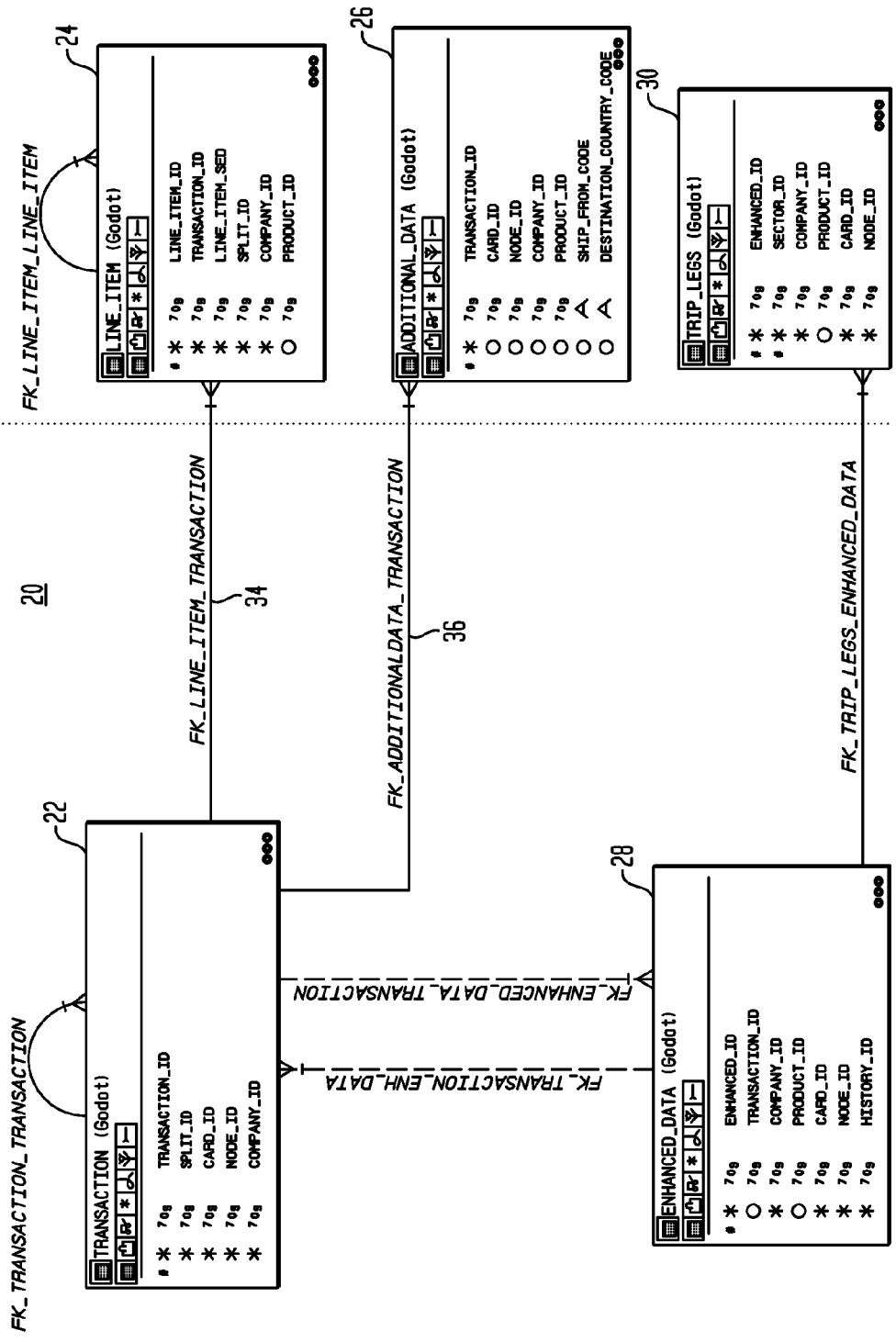
FIG. 1 is a block diagram showing transaction tables in a database according to an illustrative embodiment of the present invention.
Figure 2:
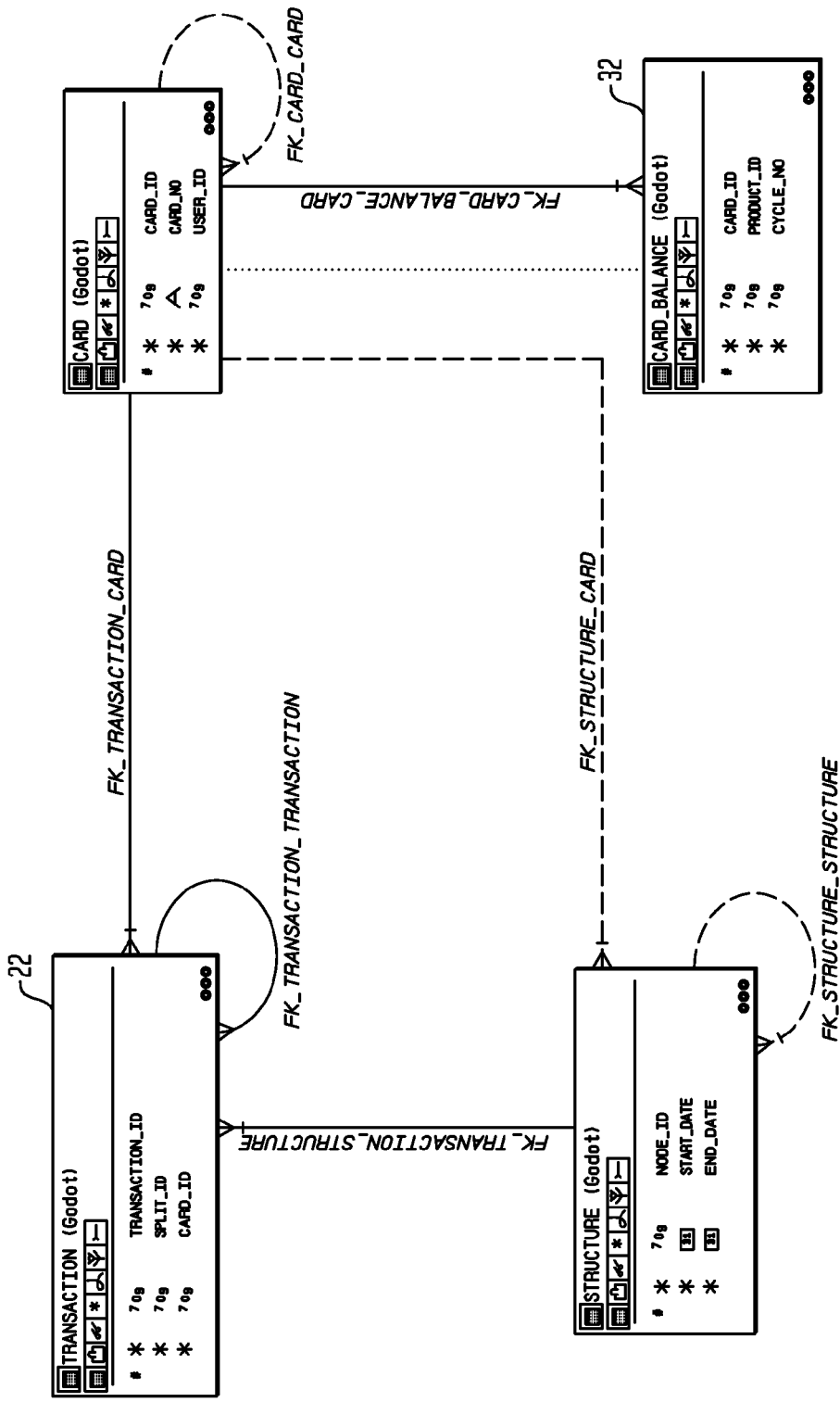
FIG. 2 is a block diagram showing further transaction tables for the illustrative embodiment.

An input processing portion of a transaction processing system for processing transaction data as would be stored in a data base for further processing according to the invention, is described in co-owned pending application Ser. No. 10/828,811, which is fully incorporated herein by reference. FIG. 1 provides some details and structure of the database setup 20 for such a transaction processing system, which in the illustrative embodiment involves stored tables in an Oracle brand database. In this embodiment, tables hold transaction information for commercial credit card transactions. Such tables for the illustrative embodiment include a transaction table 22, line item table 24, the additional data table 26, the enhanced data table 28, and the trip legs table 30, along with some relational links 34, 36 between these tables within the database 20. The relational links indicated by solid lines are mandatory in the data configuration in the illustrative embodiment, while the dotted line links are optional depending on the system. These links are part of what provides enhanced data access in the system, in that related data in the different tables is properly linked together, typically by transaction, to allow easy access and retrieval. FIG. 2 provides some details and structure for the card balance table 32, along with relational links to other structures and tables (including the transaction table 22) within the database system.

Figure 3:
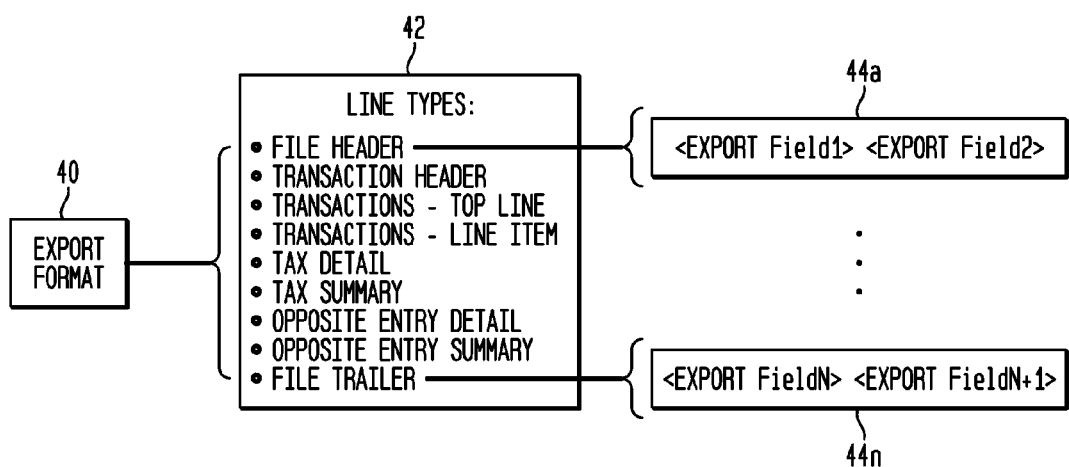
FIG. 3 provides an overview of export format setup according to the present invention.

The present invention allows a user to assemble an export format, which defines both what data to export from the database 20, and also the proper format for such data. FIG. 3 provides an overview of export format setup in accordance with the present invention. An export format 40 describe the output layout of an export file. Export formats 40 are created from a defined list of line types 42. The list of line types 42 is:

File Header
Transaction Header
Transactions—Top Line
Transactions—Line Item
Tax Detail
Tax Summary
Opposite Entry Detail
Opposite Entry Summary
File Trailer The illustrative embodiment places certain restrictions on the line types 42 that can be selected and added to an export format 40. This is because of accounting logic or overall ledger procedures for such data. By enforcing these restrictions the illustrative embodiment avoids export formats which do not work. One such restriction is that the line types 42 sequence in the export format 40 is predetermined and cannot be rearranged. This enforces accounting logic and practice to ensure valid export formats are created by the users.

Another restriction is that certain line types 42 are mutually exclusive, and if one line type 42 is present, another is precluded. The illustrative embodiment includes three such restrictions: either Transaction—Top Line or Transaction—Line Item; either Tax Detail or Tax Summary; and finally either Opposite Entry Detail or Opposite Entry Summary. With respect to Line Item, the user takes a decision to post to the Ledger at top line level or at line item detail level—it is not appropriate to allow a user to choose both options as this would mean duplicate posting of a transaction, e.g. if a transaction comes in for Paperman Stationery Company for 100 USD (this detail is available at top line level), the transaction may also have additional information such as 10 boxes of paper 50 USD and 20 boxes of pens 50 USD. The company can choose to cost allocation and post the top line amount or the amounts at the line level—posting both would mean an amount of 200 USD would be populated into the Ledger for this transaction. With respect to either Tax Detail or Tax Summary—some companies want to post a tax amount for each transaction, other companies want to post a Total Tax amount (per tax rate) for the file, again posting both would mean a duplicate Tax amount posted to the Ledger). Finally either Opposite Entry Detail or Opposite Entry Summary must be selected, as the company may choose to post an opposite entry line for each line in the file or one opposite entry line for the whole file—again posting both would mean a duplicate opposite entry amount posted to the ledger. The present invention allows other restrictions to be included, or the removal of these restrictions if advantageous or necessary.

Each line type 42 has a set of export fields 44 that can be added in sequence to define what data from the database will be inserted on a line in the export file. For the illustrative embodiment, a list of the export fields 44 available for each line type is provided in Appendix I. For data other than transactional data or commercial card account data, different export fields may be used or included. Once a user assigns a line type 42 to an export file 40, the user can then add export fields 44 to that line type, to define what data will be filled in on the line in the export data, as will be described hereinafter. Export fields can be grouped and moved in sequence. Each export field has properties that can be set at a global or individual field level. Global properties affect all matching export fields in an export format, however any export field can have properties set at the individual field level, wherein that export field will be different from the global properties setting.

Figure 4B:
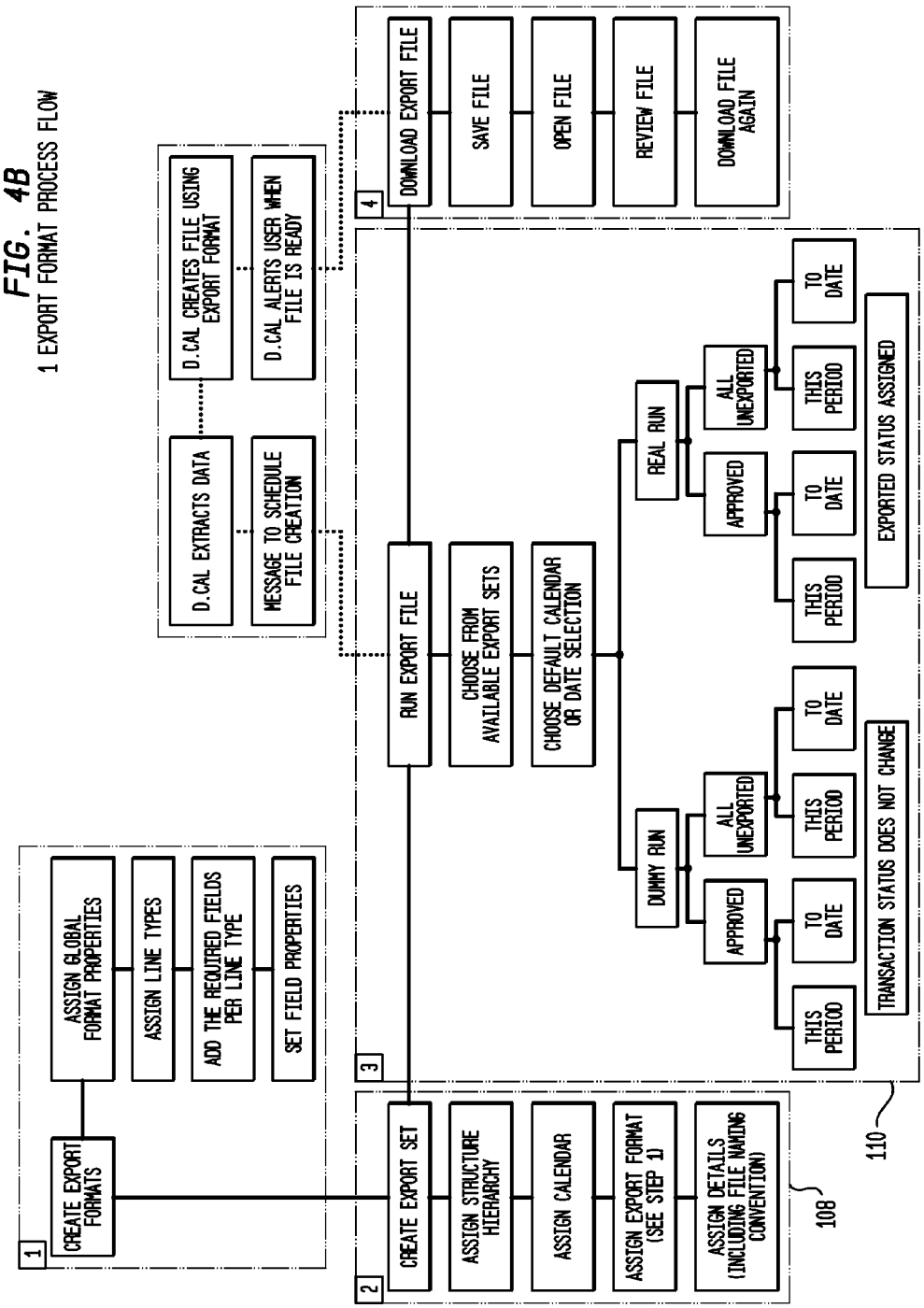
FIG. 4B is a more detailed flow chart of export data processing according to the present invention.

The steps performed by a user using the illustrative embodiment to set up an export format are shown in FIGS. 4A and 4B. The first step as prescribed by the system is to name the new export format, step 100 (FIG. 4A). The system can store as many different export formats as necessary, including multiple export formats for the same data set in the database (for example when the data will be loaded into several different ledgers), so the name helps distinguish between various export formats. The next step is to set up the export format, step 102. This involves assigning or selecting global defaults for dates, amounts, and characters and number lengths. In the illustrative embodiment, these fields are mandatory. All other fields have defaults automatically applied, but can be individually edited to suit the needs of the export. The defaults for these values is shown in Table 1:

TABLE 1

|  | Values | Defaults |
|---|---|---|
| Date | | |
| Length | The maximum date length is 10 | Blank |
| Justify | Left Right | Left |
| Padding | Zero Blanks | Blanks |
| Date Separators | / — . None | / |
| Date Format | DDMMYY DDMMYYYY MMDDYY MMDDYYYY YYMMDD YYYYMMDD JULIAN(YYDDD) | DDMMYYYY |
| Amounts | | |
| Length | | Blank |
| Justify | Right Left | Right |
| Padding | Zeros Blanks | Blanks |
| Sign Options | Leading Trailing | Leading |
| Indicators | Always Positive Always Negative Reverse Standard None | Standard |
| No. of Decimals | Maximum number of decimals is 6. | 2 Show 'Decimals Checkbox' is selected. |
| Character/Numbers | | |
| Length | Max length 999 | |
| Justify | Right Left | Left |
| Padding | Blanks | Blanks |

Figure 5:
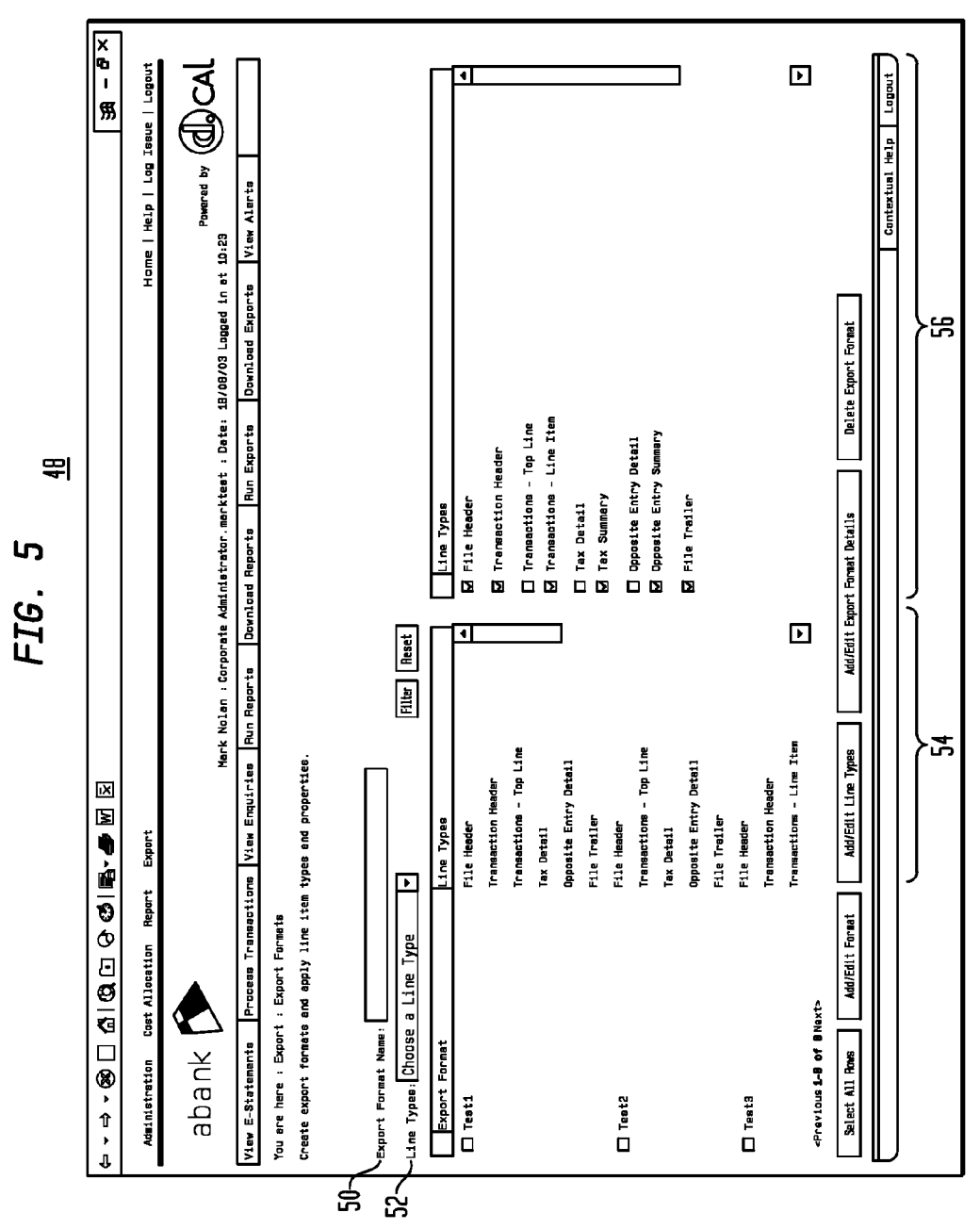

The user then adds lines types for each line in the export format, step 104. FIG. 5 shows for the illustrative embodiment a GUI export format details screen 48 to assist the user to build the export files in the correct format for the destination accounting system. The name of the export format 50 and the line types 52 are displayed near the top of the screen 48. The list of line types is shown in the right-hand panel 56. Selecting the checkboxes of the line types adds that line type to the format in the left panel 54. The restrictions previously described are enforced by this panel 56, for example only one check box may be checked for either the Transaction—Top line, or the Transaction—Line Item line type.

Figure 6:
FIG. 6 is a display for the illustrative embodiment showing field setup for an export format.

The user then determines export fields for each line type in the export format, step 106 FIG. 4A. In the illustrative embodiment this is performed by selecting from a list of export fields contained within each selected line type. Each of the export fields can be reordered in sequence and have global or individual field properties applied to them. A display screen for this step is shown in FIG. 6. The user selects a line type from the dropdown selection box 52 and then selects the checkboxes of the fields to move in the left-hand panel 54. The user can select all the fields by selecting Select All Rows button. The user then moves the fields by selecting the Move Fields button, whereupon the selected fields are added to the right-hand panel. Export fields can be added more than once to the right-hand panel.

Each field is assigned global properties (i.e. date, Amount, Character or Numeric), but each individual field can have its properties overwritten. By default all fields are given a status of 'Global', when over-written a fields status is set to 'Field'. Each field has a 'Row No.', 'Start at' and 'Length' value allowing the user to keep track of the outputs total length. The user can also add text fields and supply text for such fields.

The next step 108 FIG. 4A is to define the export set. This defines:

a) Where in the Hierarchy the file is being run from (all transactions below this point will be included in the Export File)
b) What period/date range the file should be created for (i.e. associate a calendar)
c) What the file-naming convention should be (ability to include run number/run date in the file name etc.)
d) The Export Format (as outlined above) is linked to the export set determining the lines, fields and output for the file.

Further detail with respect to export processing is illustrated in FIG. 4B. The user then runs the export 110. During this process the user chooses from the available export sets. Although the export set defines the calendar periods to be defaulted to the user, the user can override the date range and other run options during this process. The export can be run in two modes—real run or dummy run. By running the file in real run mode, all of the transactions in the Export file are marked with a transaction status of EXPORTED. This flag ensures that the same transactions cannot be included again in a subsequent Real Export file.

The dummy run facility allows the user to create the Export File in test mode. By running the file in DUMMY mode, the status of the transactions will not change and will retain the same status as they had before the outbound file was created. This ensures that the user can create outbound files as required, to perfect and investigate the content of the file prior to importing that file to the Ledger. In the case of either real or dummy run the user can choose to export either Approved transactions for the specified period or Approved transactions to date. In addition to this the user can choose to run the export to include All Unexported transactions for the selected period or All Unexported transactions to date.

Once the system has generated the export file it is made available for download by the user. The user is alerted as to when the file is complete and then has the option of saving the file locally or opening the file to view it. Once this is done the user can place it in an appropriate location for Upload to the Ledger (112). The files remain available for download for a period of time, e.g. 30 days. The file can be downloaded more than once during this period.

The user can test the export function as necessary to verify proper functioning, and then run the export function to export the properly formatted data to a file, step 110 (FIG. 4A). Once this is complete, the exported file can be uploaded into the general ledger 112 (FIG. 4A) by the usual means known in the art.

The present invention greatly simplifies the set up and running of data to be exported to other data systems. Although described in terms of transactional data stored in a database, the present invention can be used for any type of data exporting, where flexibility in creating output formats is helpful or efficient. The present invention can be implemented on any type of computer or system, such as a multi-processor system or a single processor system or microcontroller system.

Although the invention has been shown and described with respect to illustrative embodiments thereof, various other changes, omissions and additions in the form and detail thereof may be made therein without departing from the spirit and scope of the invention.

APPENDIX I

List of Fields Available Against Each Line Type
1.1 Line Type 1: File Header
1.1.1 Record ID
   Each line type is numbered. The File header has a record ID of 1.
1.1.2 Line Number
   Each line in the file is given a unique number in ascending sequence.
1.1.3 Export Run Number
   The Export Run Number is a unique number in ascending order representing the file. The first export file to be run by the corporate will be assigned an Export Run Number of 000001. By default this number will increase by one each time a real export is run. The corporate has the option of increasing this number on test runs.
1.1.4 Export Date
   All dates in this file are formatted in the same way dd/mm/yyyy. The export date is the date the export file is created
1.1.5 Export Time
   This is the time the export file is created. The time format is hh:mm:ss.
1.1.6 Structure Node Description
   This describes the entity/structure node from against which the export has been run.
1.1.7 Export Period Number
   This is the export period to which the transaction belongs. Any transaction whose posting date falls within this period is assigned this period number.
1.1.8 Balancing Total
   The balancing total is the total billing amount of transactions in the file
1.1.9 Billing Period End Date
   This is the last day of the current billing cycle to which the card belongs. Date format is as per all date formats dd/mm/yyyy 1.1.10 Transaction Line Count
   This the total amount of transaction lines in the file. The total number of lines in the file less the File Header and File Trailer lines.

|    | FILE HEADER                  | LENGTH | Format Eg           |
|----|------------------------------|--------|---------------------|
| 1  | Record Identifier (line type number) | 1 |                 |
| 2  | Line Number                  | 6      | 000001              |
| 3  | Export Run Number            | 6      | 000001              |
| 4  | Export date                  | 10     | dd/mm/yyyy          |
| 5  | Time of Export               | 10     | hh:mm:ss            |
| 6  | Structure node description   | 40     |                     |
| 7  | Export Period Number         | 3      | 001                 |
| 8  | Balancing Total              | 16     | +999999999999.99    |
| 9  | Billing Period End Date      | 10     | dd/mm/yyyy          |
| 10 | Transaction Line Count       | 10     | 0000000001          |
|    | Total Line Length            | 112    |                     |

1.2 Line Types 2,3,9: TX Header(2), Top Line(3) and TX Trailer(9)
   These lines are output once per transaction. Presently the Transaction Header, Transaction Trailer and the Top Line Transaction line types are identical.
1.2.1 Record ID
   Each line type is numbered. The Line Item detail line has a record ID of 2, Tax Detail has a record ID of 6 and Opposite Entry detail has record ID of 7.
1.2.2 Line Number
   Each line in the file is given a unique number in ascending sequence. The first line item of each file will always start on 000002.
1.2.3 Document Run Number
   The Document Run Number is a unique number per transaction in ascending sequence. The first transaction of the first export file to be run by the corporate will be assigned a Document Run Number of 000001, the next transaction 000002 etc. This number will continue to increase as each real export file is created until 999999 is reached and the counter resets to 000001
1.2.4 Transaction Date
   All dates in this file are formatted in the same way dd/mm/yyyy. The transaction date is the date the transaction took place
1.2.5 Posting Date
   All dates in this file are formatted in the same way dd/mm/yyyy. The posting date is the date the transaction was processed by the Bank
1.2.6 Cardholder Name
   This is the cardholder surname and name as entered by the Card Administrator.
1.2.7 Cardholder Number
   This is the cardholder number, masked by default
1.2.8 Employee ID
   This is the employee ID as entered by the Card Administrator.
1.2.9 Structure Node Description
   This describes the entity/structure node to which the cardholder is attached
1.2.10 Standard Reference Number
   This is a unique reference number assigned to the transaction when processed by the Bank.
   This field is numeric and 23 characters in length 1.2.11 Top line/Transaction TAX-Exclusive Amount: TOTAL Where the supplier is Non-TAX-capable or the transaction is non-evidence for TAX, the TAX Exclusive amount is taken from the top line of the transaction.

If the D.CAL user does not apply TAX to the transaction prior to the export file being created, the TAX Exclusive Amount will output as the Billing Amount.

1.2.12 Top Line/Transaction TAX Rate Description/Code

Where the supplier is Non-TAX-capable or the transaction is non-evidence for TAX, a TAX rate description is output only where it is manually applied to the transaction by the D.CAL user. Where no TAX rate description is applied, no TAX rate description is output.

1.2.13 Top Line/Transaction TAX Rate

Where the supplier is Non-TAX-capable or the transaction is non-evidence for TAX, a TAX rate is output only where it is manually applied to the transaction by the D.CAL user. Where no TAX rate is applied, no TAX rate is output.

1.2.14 Top Line/TAX Amount

Where the supplier is Non-TAX-capable or the transaction is non-evidence for TAX, a TAX amount is output only where the TAX rate and description is manually applied to the transaction by the D.CAL user. Where no TAX rate is applied, no TAX amount is output 1.2.15 Top line/Transaction Billing Amount This is the Vat Inclusive amount of the top line transaction 1.2.16 Balancing Total The balancing total in the Line Item Detail line is the Tax-Exclusive Amount.

The balancing total in the Tax Detail line is the Tax Amount.

The balancing total in the Opposite Entry Detail line is the minus Billing Amount 1.2.17 Billing Currency Code This is the currency code of the card based on VISA's currency code listing—GBP, USD etc 1.2.18 Original Currency Code This is the currency code of the country in which the transaction takes place based on VISA's currency code listing 1.2.19 Billing Period End Date This is the last day of the current billing cycle to which the card belongs. Date format is as per all date formats dd/mm/yyyy 1.2.20 Export Period End Date This is the last day of the current export/GL period. Date format is as per all date formats dd/mm/yyyy.

1.2.21 Export Period Number

This is the export period to which the transaction belongs. Any transaction whose posting date
falls within this period is assigned this period number.

1.2.22 CRC—Customer Reference Code

This is the reference quoted by the cardholder at the Point of Sale. This may be alpha-numeric and up to 16 characters in length 1.2.23 CAG—Cost Allocation Group This is the description of the Cost Allocation Group to which the cardholder has been attached.

This may be made up of one or multiple codes.

1.2.24 CACs 1 to 12

Each corporate can use up to 12 cost allocation levels. Where the corporate only uses 3 levels, for example Account Code, Cost Centre and Project Code, then only 3 levels will be output in this file. These codes will have been applied to each transaction automatically by D.CAL or manually by D.CAL users.

1.2.25 Split Y/N Flag

On D.CAL users may manually split transactions into multiple parts for cost allocation or TAX purposes. This flag is to indicate whether the relevant line in the export file has been split or not 1.2.26 MCC Description This is the description of the VISA MCC (Merchant Category Code) of the transaction 1.2.27 Merchant Name This is the Merchant's VISA name.

E.g. N B STATIONERY LTD 1.2.28 Merchant Account Number

This is the Merchant's unique VISA account number

E.g. 0019839002

1.2.29 Merchant Location

This is the Merchant's location.

E.g. HARLOW 1.2.30 TAX capable Flag

This flag is to indicate if the supplier is TAX capable or not. 1 indicates 'Yes', 0 indicates 'No'.

1.2.31 Evidence for TAX Flag

This flag is to indicate if the transaction is evidence or non-evidence for TAX based on the VISA TAX rules 1.2.32 Export Date All dates in this file are formatted in the same way dd/mm/yyyy. The export date is the date the export file is created 1.2.33 MCC Code This is the VISA MCC (Merchant Category Code) of the transaction.

1.2.34 Original Amount (Top Line)

This is the original purchase amount in the currency of origin 1.2.35 Transaction Type Is a code describing whether the transaction is a Purchase, Cash Advance, Fee or Payment 1.2.36 Exchange Rate This is the billing divided by the original amount 1.2.37 User Comment The is a comment line added to a transaction or line item by the user using the D.CAL application

|    | TX Header/Top Line           | LENGTH | FORMAT           |
|----|------------------------------|--------|------------------|
| 1  | Record Identifier            | 1      |                  |
| 2  | Line Number                  | 6      | 000002           |
| 3  | Document Run Number          | 6      | 000001           |
| 4  | Transaction Date             | 10     | Dd/mm/yyyy       |
| 5  | Posting Date                 | 10     | Dd/mm/yyyy       |
| 6  | Cardholder Name              | 41     |                  |
| 7  | Card Number                  | 19     |                  |
| 8  | Employee ID                  | 20     |                  |
| 9  | Structure node description   | 40     |                  |
| 10 | Stan Reference               | 30     |                  |
| 11 | Transaction TAX-Exclusive Amount | 16 | +999999999999.99 |
| 12 | Transaction Rate Description | 40     |                  |
| 13 | Transaction Tax Rate         | 5      | 99.99            |
| 14 | Transaction TAX Amount       | 16     | +999999999999.99 |
| 15 | Transaction Billing Amount   | 16     | +999999999999.99 |
| 16 | Balancing Total Amount       | 16     | +999999999999.99 |
| 17 | Billing Currency Code        | 5      | GBP              |
| 18 | Original Currency Code       | 5      | GBP              |

-continued

| | TX Header/Top Line | LENGTH | FORMAT |
|---|---|---|---|
| 19 | Billing Period end date | 10 | dd/mm/yyyy |
| 20 | Export Period end date | 10 | dd/mm/yyyy |
| 21 | Export Period Number | 3 | 999 |
| 22 | CRC | 25 | |
| 23 | CAG | 40 | |
| 24-35 | Top Line/Split (CAC 1 to 12) | 240 | (depending on num cacs 0-12 @20 each) |
| 36 | Split Y/N flag | 1 | |
| 37 | MCC description | 40 | |
| 38 | Vendor Name | 40 | |
| 39 | Vendor Merchant Account No | 16 | |
| 40 | Vendor Location | 20 | |
| 41 | Non-Vat capable Flag | 1 | |
| 42 | Non-Evidence for VAT flag | 1 | |
| 43 | Export date | 10 | dd/mm/yyyy |
| 44 | MCC Code | 4 | 0001 |
| 45 | Original Amount | 16 | +999999999999.99 |
| 46 | Transaction Type | 3 | |
| 47 | Exchange Rate | 8 | +9999.99 |
| 48 | User Comment | 40 | |
| | Total Line Length | 830 | |

1.3 Line Type 4: Line Item detail
A line is output for each transaction line item, unless the transaction is non-evidence for vat and then only the top line transaction is output.

1.3.1 Record ID
Each line type is numbered. The Line Item detail line has a record ID of 2, Tax Detail has a record ID of 6 and Opposite Entry detail has record ID of 7.

1.3.2 Line Number
Each line in the file is given a unique number in ascending sequence. The first line item of each file will always start on 000002.

1.3.3 Document Run Number
The Document Run Number is a unique number per transaction in ascending sequence. The first transaction of the first export file to be run by the corporate will be assigned a Document Run Number of 000001, the next transaction 000002 etc. This number will continue to increase as each real export file is created until 999999 is reached and the counter resets to 000001

1.3.4 Transaction Date
All dates in this file are formatted in the same way dd/mm/yyyy. The transaction date is the date the transaction took place 1.3.5 Posting Date
All dates in this file are formatted in the same way dd/mm/yyyy. The posting date is the date the transaction was processed by the Bank 1.3.6 Cardholder Name
This is the cardholder surname and name as entered by the Card Administrator.

1.3.7 Cardholder Number
This is the cardholder number, masked by default 1.3.8 Employee ID
This is the employee ID as entered by the Card Administrator.

1.3.9 Structure Node Description
This describes the entity/structure node to which the cardholder is attached 1.3.10 Standard Reference Number
This is a unique reference number assigned to the transaction when processed by the Bank.
This field is numeric and 23 characters in length 1.3.11 Line Item TAX-Exclusive Amount: TOTAL
Where the supplier is TAX-capable (capable of passing line and TAX details) there will be an individual line item for each product purchased by the cardholder as part of that transaction.
All amount fields in the export file are 16 characters in length, have leading signs and are filled with zeros—+0000000000120.00.
A debit, credit and total column is output on each transaction. This gives the corporate the option of choosing the total or debit and credit columns 1.3.12 Top Line Transaction TAX-Exclusive Amount: TOTAL Where the supplier is Non-TAX-capable or the transaction is non-evidence for TAX, the TAX Exclusive amount is taken from the top line of the transaction.
If the D.CAL user does not apply TAX to the transaction prior to the export file being created, the TAX Exclusive Amount will output as the Billing Amount.

1.3.13 Line Item TAX Rate Description
Where the supplier is TAX-capable (capable of passing line and TAX details) there will be an individual TAX rate description for each product purchased by the cardholder as part of that transaction. On set-up, the TAX rate description for the TAX rate of each relevant country is entered by the corporate. The TAX rate description is then automatically picked up by the D.CAL system.

1.3.14 Line Item TAX Rate
Where the supplier is TAX-capable (capable of passing line and TAX details) there will be an individual TAX rate for each product purchased by the cardholder as part of that transaction.
The TAX rate and its relevant TAX rate description are automatically picked up by the D.CAL system.

1.3.15 Top Line Transaction TAX Rate Description
Where the supplier is Non-TAX-capable or the transaction is non-evidence for TAX, a TAX rate description is output only where it is manually applied to the transaction by the D.CAL user. Where no TAX rate description is applied, no TAX rate description is output.

1.3.16 Top Line Transaction TAX Rate
Where the supplier is Non-TAX-capable or the transaction is non-evidence for TAX, a TAX rate is output only where it is manually applied to the transaction by the D.CAL user. Where no TAX rate is applied, no TAX rate is output.

1.3.17 Line Item TAX Amount
Where the supplier is TAX-capable (capable of passing line and TAX details) there will be an individual TAX Amount for each product purchased by the cardholder as part of that transaction. This is calculated by the system based on the Tax Rate and line total.

1.3.18 Top Line TAX Amount
Where the supplier is Non-TAX-capable or the transaction is non-evidence for TAX, a TAX amount is output only where the TAX rate and description is manually applied to the transaction by the D.CAL user. Where no TAX rate is applied, no TAX amount is output 1.3.19 Line Item Billing Amount
This is the Vat inclusive amount of the line item.

1.3.20 Top Line Transaction Billing Amount
This is the Vat Inclusive amount of the top line transaction 1.3.21 Balancing Total
The balancing total in the Line Item Detail line is the Tax-Exclusive Amount.
The balancing total in the Tax Detail line is the Tax Amount.

The balancing total in the Opposite Entry Detail line is the minus Billing Amount 1.3.22 Billing Currency Code This is the currency code of the card based on VISA's currency code listing—GBP, USD etc 1.3.23 Original Currency Code This is the currency code of the country in which the transaction takes place based on VISA's currency code listing 1.3.24 Billing Period End Date This is the last day of the current billing cycle to which the card belongs. Date format is as per all date formats dd/mm/yyyy 1.3.25 Export Period End Date This is the last day of the current export/GL period. Date format is as per all date formats dd/mm/yyyy.

1.3.26 Export Period Number

This is the export period to which the transaction belongs. Any transaction whose posting date falls within this period is assigned this period number.

1.3.27 CRC—Customer Reference Code

This is the reference quoted by the cardholder at the Point of Sale. This may be alpha-numeric and up to 16 characters in length 1.3.28 CAG—Cost Allocation Group This is the description of the Cost Allocation Group to which the cardholder has been attached.

This may be made up of one or multiple codes.

1.3.29 CACs 1 to 12

Each corporate can use up to 12 cost allocation levels. Where the corporate only uses 3 levels, for example Account Code, Cost Centre and Project Code, then only 3 levels will be output in this file. These codes will have been applied to each transaction automatically by D.CAL or manually by D.CAL users.

1.3.30 Split Y/N Flag

On D.CAL users may manually split transactions into multiple parts for cost allocation or TAX purposes. This flag is to indicate whether the relevant line in the export file has been split or not 1.3.31 MCC Description This is the description of the VISA MCC (Merchant Category Code) of the transaction 1.3.32 Merchant Name This is the Merchant's VISA name.

E.g. N B STATIONERY LTD 1.3.33 Merchant Account Number

This is the Merchant's unique VISA account number

E.g. 0019839002

1.3.34 Merchant Location

This is the Merchant's location.

E.g. HARLOW 1.3.35 TAX Capable Flag

This flag is to indicate if the supplier is TAX capable or not. 1 indicates Yes, 0 indicates No.

1.3.36 Evidence for TAX Flag

This flag is to indicate if the transaction is evidence or non-evidence for TAX based on the VISA TAX rules 1.3.37 Item or Commodity Description This is the item description of each product purchased. This will only be available if the merchant is LID TAX capable. Each merchant has it's own unique set of item descriptions.

A LID merchant will output either item description OR commodity code description not both.

Commodity code descriptions are based on the VISA commodity code list.

SUMM TAX capable merchants will always pass a commodity code.

Non TAX capable merchants will not pass VISA commodity codes 1.3.38 Product Code This is the product code of each product purchased. Each merchant has it's own unique set of product codes. Only LID merchants will pass product codes SUMM and Non TAX capable merchants will not pass product codes 1.3.39 Quantity This is the quantity of each product purchased. Only LID merchants will pass unit quantity SUMM and Non TAX capable merchants will not pass unit quantity 1.3.40 Unit Cost This is the unit cost of each product purchased. Only LID merchants will pass unit cost SUMM and Non TAX capable merchants will not pass unit cost 1.3.41 Discount There may be discount on the top line transaction or on each line item or on both.

Both LID and SUMM merchants will pass discount amounts

Non TAX capable merchants will not pass discount amounts.

1.3.42 Export Date

All dates in this file are formatted in the same way dd/mm/yyyy. The export date is the date the export file is created 1.3.43 MCC Code This is the VISA MCC (Merchant Category Code) of the transaction 1.3.44 Original Amount (Line Item)

This is the line item total amount plus the vat amount in the currency of origin 1.3.45 Original Amount (Top Line)

This is the original purchase amount in the currency of origin 1.3.46 Transaction Type Is a code describing whether the transaction is a Purchase, Cash Advance, Fee or Payment.

1.3.47 Commodity Code

The commodity code field is based on the VISA commodity code list.

A merchant assigns a generic code to describe one of his products.

1.3.48 Sequence Number

Gives the order of line items per transaction 1.3.49 Unit of Measure

Units measuring the quantity of product 1.3.50 Exchange Rate

This is the billing divided by the original amount 1.3.51 User Comment

The is a comment line added to a transaction or line item by the user using the D.CAL application 1.3.52 Split Description This is the description of a split line as defined by the user on splitting a transaction top line.

1.3.53 Addendum Indicator

This is an indicator for addendum lines (S indicates a split line/L indicates a line item).

| | LINE ITEM DETAIL | TOP LINE | LENGTH | FORMAT |
|---|---|---|---|---|
| 1 | Record Identifier | Record Identifier | 1 | |
| 2 | Line Number | Line Number | 6 | 000001 |
| 3 | Document Run Number | Document Run Number | 6 | 000001 |
| 4 | Transaction Date | Transaction Date | 10 | Dd/mm/yyyy |
| 5 | Posting Date | Posting Date | 10 | Dd/mm/yyyy |
| 6 | Cardholder Name | Cardholder Name | 41 | |
| 7 | Card Number | Card Number | 19 | |
| 8 | Employee ID | Employee ID | 20 | |
| 9 | Structure node description(as above) | Structure node description(as above) | 40 | |
| 10 | Stan Reference | Stan Reference | 30 | |
| 11 | Line item TAX-Exclusive Amount (signed) | Line item TAX-Exclusive Amount (signed) | 16 | +999999999999.99 |
| 12 | Line item TAX Rate Description | Line item TAX Rate Description | 40 | |
| 13 | Line item TAX Rate | Line item TAX Rate | 5 | 99.99 |
| 14 | Line item TAX Amount (signed) | Line item TAX Amount (signed) | 16 | +999999999999.99 |
| 15 | Line item Billing Amount (signed) | Line item Billing Amount (signed) | 16 | +999999999999.99 |
| 16 | Balancing Total Amount | Balancing Total Amount | 16 | +999999999999.99 |
| 17 | Billing Currency Code | Billing Currency Code | 5 | GBP |
| 18 | Original Currency Code | Original Currency Code | 5 | GBP |
| 19 | Billing Period end date | Billing Period end date | 10 | dd/mm/yyyy |
| 20 | Export Period end date | Export Period end date | 10 | dd/mm/yyyy |
| 21 | Export Period Number | Export Period Number | 3 | 001 |
| 22 | CRC (can you pick this up from top line if it exists) | CRC (can you pick this up from top line if it exists) | 25 | |
| 23 | CAG | CAG | 40 | |
| 24-35 | Line item (CAC 1-12) | Line item (CAC 1-12) | 240 | |
| 36 | Split Y/N flag | Split Y/N flag | 1 | |
| 37 | MCC description | MCC description | 40 | |
| 38 | Vendor Name | Vendor Name | 40 | |
| 39 | Vendor Merchant Account No | Vendor Merchant Account No | 16 | |
| 40 | Vendor Location | Vendor Location | 20 | |
| 41 | Non-Vat/Vat capable Flag | Non-Vat/Vat capable Flag | 1 | |
| 42 | Evidence/Non-Evidence Flag | Evidence/Non-Evidence Flag | 1 | |
| 43 | Commodity Description or Item Description | N/A | 26 | |
| 44 | Product Code | N/A | 12 | |
| 45 | Quantity | N/A | 10 | 9999999.99 |
| 46 | Unit Cost | N/A | 10 | +9999999.99 |
| 47 | Discount | N/A | 10 | +9999999.99 |
| 48 | Export Date | Export Date | 10 | dd/mm/yyyy |
| 49 | MCC Code (usually be 0000) | MCC Code (usually be 0000) | 4 | 0001 |
| 50 | Original Amount | Original Amount | 16 | +999999999999.99 |
| 51 | Transaction Type | Transaction Type | 3 | |
| 52 | Commodity Code | N/A | 4 | 0001 |
| 53 | Sequence Number | N/A | 3 | 001 |
| 54 | Unit of Measure | N/A | 12 | |
| 55 | Exchange Rate | Exchange Rate | 8 | +9999.99 |
| 56 | User Comment | User Comment | 40 | |
| 57 | Split Description | Split Description | 40 | |
| 58 | Addendum Indicator | Addendum Indicator | 1 | L or S |
| | Total Line length | | 958 | |

1.4 Line Type 5: Tax Detail

This line is output once per transaction detail line (i.e. LID or Top Line).

1.4.1 Record ID

Each line type is numbered. The Line Item detail line has a record ID of 2, Tax Detail has a record ID of 6 and Opposite Entry detail has record ID of 7.

1.4.2 Line Number

Each line in the file is given a unique number in ascending sequence. The first line item of each file will always start on 000002.

1.4.3 Document Run Number

The Document Run Number is a unique number per transaction in ascending sequence. The first transaction of the first export file to be run by the corporate will be assigned a Document Run Number of 000001, the next transaction 000002 etc. This number will continue to increase as each real export file is created until 999999 is reached and the counter resets to 000001

1.4.4 Transaction Date
All dates in this file are formatted in the same way dd/mm/yyyy. The transaction date is the date the transaction took place 1.4.5 Posting Date
All dates in this file are formatted in the same way dd/mm/yyyy. The posting date is the date the transaction was processed by the Bank 1.4.6 Cardholder Name
This is the cardholder surname and name as entered by the Card Administrator.

1.4.7 Cardholder Number
This is the cardholder number, masked by default 1.4.8 Employee ID
This is the employee ID as entered by the Card Administrator.

1.4.9 Structure Node Description
This describes the entity/structure node to which the cardholder is attached 1.4.10 Standard Reference Number
This is a unique reference number assigned to the transaction when processed by the Bank.
This field is numeric and 23 characters in length 1.4.11 Line Item TAX Rate Description
Where the supplier is TAX-capable (capable of passing line and TAX details) there will be an individual TAX rate description for each product purchased by the cardholder as part of that transaction. On set-up, the TAX rate description for the TAX rate of each relevant country is entered by the corporate. The TAX rate description is then automatically picked up by the D.CAL system.

1.4.12 Top Line Transaction TAX Rate Description
Where the supplier is Non-TAX-capable or the transaction is non-evidence for TAX, a TAX rate description is output only where it is manually applied to the transaction by the D.CAL user. Where no TAX rate description is applied, no TAX rate description is output.

1.4.13 Line Item TAX Rate
Where the supplier is TAX-capable (capable of passing line and TAX details) there will be an individual TAX rate for each product purchased by the cardholder as part of that transaction.
The TAX rate and its relevant TAX rate description are automatically picked up by the D.CAL system.

1.4.14 Top Line Transaction TAX Rate
Where the supplier is Non-TAX-capable or the transaction is non-evidence for TAX, a TAX rate is output only where it is manually applied to the transaction by the D.CAL user. Where no TAX rate is applied, no TAX rate is output.

1.4.15 Line Item TAX Amount
Where the supplier is TAX-capable (capable of passing line and TAX details) there will be an individual TAX Amount for each product purchased by the cardholder as part of that transaction. This is calculated by the system based on the Tax Rate and line total.

1.4.16 Top Line TAX Amount
Where the supplier is Non-TAX-capable or the transaction is non-evidence for TAX, a TAX amount is output only where the TAX rate and description is manually applied to the transaction by the D.CAL user. Where no TAX rate is applied, no TAX amount is output 1.4.17 Balancing Total
The balancing total in the Line Item Detail line is the Tax-Exclusive Amount.
The balancing total in the Tax Detail line is the Tax Amount.
The balancing total in the Opposite Entry Detail line is the minus Billing Amount 1.4.18 Billing Currency Code
This is the currency code of the card based on VISA's currency code listing—GBP, USD etc 1.4.19 Original Currency Code
This is the currency code of the country in which the transaction takes place based on VISA's currency code listing 1.4.20 Billing Period End Date
This is the last day of the current billing cycle to which the card belongs. Date format is as per all date formats dd/mm/yyyy 1.4.21 Export Period End Date
This is the last day of the current export/GL period. Date format is as per all date formats dd/mm/yyyy.

1.4.22 Export Period Number
This is the export period to which the transaction belongs. Any transaction whose posting date falls within this period is assigned this period number.

1.4.23 CRC—Customer Reference Code
This is the reference quoted by the cardholder at the Point of Sale. This may be alpha-numeric and up to 16 characters in length 1.4.24 CAG—Cost Allocation Group
This is the description of the Cost Allocation Group to which the cardholder has been attached.
This may be made up of one or multiple codes.

1.4.25 CACs 1 to 12
Each corporate can use up to 12 cost allocation levels. Where the corporate only uses 3 levels, for example Account Code, Cost Centre and Project Code, then only 3 levels will be output in this file. These codes will have been applied to each transaction automatically by D.CAL or manually by D.CAL users.

1.4.26 Split Y/N Flag
On D.CAL users may manually split transactions into multiple parts for cost allocation or TAX purposes. This flag is to indicate whether the relevant line in the export file has been split or not 1.4.27 MCC Description
This is the description of the VISA MCC (Merchant Category Code) of the transaction 1.4.28 Merchant Name
This is the Merchant's VISA name.
E.g. N B STATIONERY LTD 1.4.29 Merchant Account Number
This is the Merchant's unique VISA account number
E.g. 0019839002

1.4.30 Merchant Location
This is the Merchant's location.
E.g. HARLOW 1.4.31 TAX Capable Flag
This flag is to indicate if the supplier is TAX capable or not. 1 indicates Yes, 0 indicates No.

1.4.32 Evidence for TAX Flag
This flag is to indicate if the transaction is evidence or non-evidence for TAX based on the VISA TAX rules 1.4.33 Item or Commodity Description
This is the item description of each product purchased. This will only be available if the merchant is LID TAX capable. Each merchant has it's own unique set of item descriptions.
A LID merchant will output either item description OR commodity code description not both.

Commodity code descriptions are based on the VISA commodity code list.

SUMM TAX capable merchants will always pass a commodity code.

Non TAX capable merchants will not pass VISA commodity codes 1.4.34 Product Code This is the product code of each product purchased. Each merchant has it's own unique set of product codes. Only LID merchants will pass product codes SUMM and Non TAX capable merchants will not pass product codes 1.4.35 Quantity This is the quantity of each product purchased. Only LID merchants will pass unit quantity SUMM and Non TAX capable merchants will not pass unit quantity 1.4.36 Unit Cost This is the unit cost of each product purchased. Only LID merchants will pass unit cost SUMM and Non TAX capable merchants will not pass unit cost 1.4.37 Discount There may be discount on the top line transaction or on each line item or on both.

Both LID and SUMM merchants will pass discount amounts

Non TAX capable merchants will not pass discount amounts.

1.4.38 Export Date

All dates in this file are formatted in the same way dd/mm/yyyy. The export date is the date the export file is created 1.4.39 MCC Code This is the VISA MCC (Merchant Category Code) of the transaction 1.4.40 Original Amount (Line Item)

This is the line item total amount plus the vat amount in the currency of origin 1.4.41 Original Amount (Top Line)

This is the original purchase amount in the currency of origin 1.4.42 Transaction Type Is a code describing whether the transaction is a Purchase, Cash Advance, Fee or Payment 1.4.43 Commodity Code The commodity code field is based on the VISA commodity code list.

A merchant assigns a generic code to describe one of his products.

1.4.44 Sequence Number

Gives the order of line items per transaction 1.4.45 Unit of Measure

Units measuring the quantity of product 1.4.46 Exchange Rate

This is the billing divided by the original amount 1.4.47 User Comment

The is a comment line added to a transaction or line item by the user using the D.CAL application 1.4.48 Line item TAX-Exclusive Amount Where the supplier is TAX-capable (capable of passing line and TAX details) there will be an individual line item for each product purchased by the cardholder as part of that transaction.

All amount fields in the export file are 16 characters in length, have leading signs and are filled with zeros—+0000000000120.00.

A debit, credit and total column is output on each transaction. This gives the corporate the option of choosing the total or debit and credit columns 1.4.49 Top line Transaction TAX-Exclusive Amount: TOTAL Where the supplier is Non-TAX-capable or the transaction is non-evidence for TAX, the TAX Exclusive amount is taken from the top line of the transaction.

If the D.CAL user does not apply TAX to the transaction prior to the export file being created, the TAX Exclusive Amount will output as the Billing Amount.

1.4.50 Line Item Billing Amount

This is the Vat inclusive amount of the line item.

1.4.51 Top line Transaction Billing Amount

This is the Vat Inclusive amount of the top line transaction 1.4.52 Split Description This is the description of a split line as defined by the user on splitting a transaction top line.

1.4.53 Addendum Indicator

This is an indicator for addendum lines (S indicates a split line/L indicates a line item).

|    | TAX DETAIL                       | TRANSACTION                    | LENGTH | FORMAT            |
|----|----------------------------------|--------------------------------|--------|-------------------|
| 1  | Record Identifier                | Record Identifier              | 1      |                   |
| 2  | Line Number                      | Line Number                    | 6      | 000001            |
| 3  | Document Run Number              | Document Run Number            | 6      | 000001            |
| 4  | Transaction Date                 | Transaction Date               | 10     | Dd/mm/yyyy        |
| 5  | Posting Date                     | Posting Date                   | 10     | Dd/mm/yyyy        |
| 6  | Cardholder Name                  | Cardholder Name                | 41     |                   |
| 7  | Card Number                      | Card Number                    | 19     |                   |
| 8  | Employee ID                      | Employee ID                    | 20     |                   |
| 9  | Structure node description(as above) | Structure node description | 40     |                   |
| 10 | Stan Reference                   | Stan Reference                 | 30     |                   |
| 11 | Line item TAX Rate Description   | Transaction Rate Description   | 40     |                   |
| 12 | Line item TAX Rate               | Transaction Tax Rate           | 5      | 99.99             |
| 13 | Line item TAX Amount (signed)    | Transaction TAX Amount         | 16     | +999999999999.99  |
| 14 | Balancing Total                  | Balancing Total                | 16     | +999999999999.99  |
| 15 | Billing Currency Code            | Billing Currency Code          | 5      | GBP               |
| 16 | Original Currency Code           | Original Currency Code         | 5      | GBP               |

-continued

| | TAX DETAIL | TRANSACTION | LENGTH | FORMAT |
|---|---|---|---|---|
| 17 | Billing Period end date | Billing Period end date | 10 | dd/mm/yyyy |
| 18 | Export Period end date | Export Period end date | 10 | dd/mm/yyyy |
| 19 | Export Period Number | Export Period Number | 3 | 999 |
| 20 | CRC | CRC | 25 | |
| 21 | CAG | CAG | 40 | |
| 22-33 | Line item (CAC 1-12) | Top Line (CAC 1-12) | 240 | |
| 34 | Split Y/N flag | Split Y/N flag | 1 | |
| 35 | MCC description | MCC description | 40 | |
| 36 | Vendor Name | Vendor Name | 40 | |
| 37 | Vendor Merchant Account No | Vendor Merchant Account No | 16 | |
| 38 | Vendor Location | Vendor Location | 20 | |
| 39 | Non-Vat/Vat capable Flag | Non-Vat capable Flag | 1 | |
| 40 | Evidence/Non-Evidence Flag | Non-Evidence for VAT flag | 1 | |
| 41 | Commodity Description or Item Description | N/A | 26 | |
| 42 | Product Code | N/A | 12 | |
| 43 | Quantity | N/A | 10 | 9999999.99 |
| 44 | Unit Cost | N/A | 10 | +9999999.99 |
| 45 | Discount | N/A | 10 | +9999999.99 |
| 46 | Export Date | Export Date | 10 | dd/mm/yyyy |
| 47 | MCC Code (usually be 0000) | MCC Code (usually be 0000) | 4 | 0001 |
| 48 | Original Amount | Original Amount | 16 | +999999999999.99 |
| 49 | Transaction Type | Transaction Type | 3 | |
| 50 | Commodity Code | N/A | 4 | 0001 |
| 51 | Sequence Number | N/A | 3 | 001 |
| 52 | Unit of Measure | N/A | 12 | |
| 53 | Exchange Rate | Exchange Rate | 8 | +9999.99 |
| 54 | User Comment | User Comment | 40 | |
| 55 | Tax Ex Amount | Tax Ex Amount | 16 | +999999999999.99 |
| 55 | Billing Amount | Billing Amount | 16 | +999999999999.99 |
| 56 | Split Description | Split Description | 40 | |
| 57 | Addendum Indicator | Addendum Indicator | 1 | L or S |
| | Total Line length | | 958 | |

The Billing, TAX and TAX-Exclusive amount fields represent Total amounts on line items + transactions 1.5 Line Type 6: Tax Summary Where there are multiple Tax Rate codes in the output, there will be a VAT summary line per Tax Rate code. Each Summary TAX line produces a total of the TAX on all transactions with that TAX Code/TAX rate.

1.5.1 Record ID

Each line type is numbered. The Tax Summary line has a record ID of 3

1.5.2 Line Number

Each line in the file is given a unique number in ascending sequence.

1.5.3 Structure Node Description

This describes the entity/structure node to which the cardholder is attached 1.5.4 TAX Rate Description A TAX summary line is output per TAX rate description. If all transactions in the file are at the same TAX rate then only one TAX summary line is output 1.5.5 TAX Rate A TAX summary line is output per TAX rate. If all transactions in the file are at the same TAX rate then only one TAX summary line is output 1.5.6 TAX Amount This is the total TAX amount of all transactions (line item+top line TAX amounts) in the export file at the specified TAX rate 1.5.7 Balancing Total The balancing total in the Tax Summary line Total TAX amount of all transactions in the file.

1.5.8 CACs 1-12

Each TAX code has a related Cost Allocation Code(s). As each company has a unique cost allocation code for each TAX code, this must be keyed into the file manually after the file is created. By default the Cost Allocation Code fields will be TAX_CODE_CAC 1, TAX_CODE_CAC2 etc 1.5.9 Export Date All dates in this file are formatted in the same way dd/mm/yyyy. The export date is the date the export file is created 1.5.10 User Comment The is a comment line added to a transaction or line item by the user using the D.CAL application 1.5.11 Billing Period End Date This is the last day of the current billing cycle to which the card belongs. Date format is as per all date formats dd/mm/yyyy 1.5.12 Top Line Transaction and Line Item TAX-Exclusive Amount: TOTAL Where the supplier is Non-TAX-capable or the transaction is non-evidence for TAX, the TAX Exclusive amount is taken from the top line of the transaction.

If the D.CAL user does not apply TAX to the transaction prior to the export file being created, the TAX Exclusive Amount will output as the Billing Amount.

1.5.13 Top Line Transaction and Line Item Billing Amount: TOTAL

This is the Vat Inclusive amount of the top line transaction

|   | TAX SUMMARY | Length | Properties |
|---|---|---|---|
| 1 | Record Identifier | 1 | 1 |
| 2 | Line Count (unique per line) | 6 | 000001 |
| 3 | Structure node description | 40 | |
| 4 | TAX Rate Description | 40 | |
| 5 | TAX Rate | 5 | 99.99 |
| 6 | TAX Amount (signed) | 16 | +999999999999.99 |
| 7 | Balancing Total | 16 | +999999999999.99 |
| 8-19 | CACs 1-12 | 240 | |
| 20 | Export Date | 10 | dd/mm/yyyy |
| 21 | User Comment | 40 | |
| 22 | Billing Period End Date | 10 | dd/mm/yyyy |
| 23 | Tax Ex Amount | 16 | +999999999999.99 |
| 24 | Billing Amount | 16 | +999999999999.99 |
|   | Total Line length | 456 | |

The TAX amount fields represent total Line item TAX amounts plus Total Transaction TAX amounts.

1.6 Line Type 7: Opposite Entry Detail

This line is output once per transaction detail line (ie LID or TopLine).

1.6.1 Record ID

Each line type is numbered. The Line Item detail line has a record ID of 2, Tax Detail has a record ID of 6 and Opposite Entry detail has record ID of 7.

1.6.2 Line Number

Each line in the file is given a unique number in ascending sequence. The first line item of each file will always start on 000002.

1.6.3 Document Run Number

The Document Run Number is a unique number per transaction in ascending sequence. The first transaction of the first export file to be run by the corporate will be assigned a Document Run Number of 000001, the next transaction 000002 etc. This number will continue to increase as each real export file is created until 999999 is reached and the counter resets to 000001

1.6.4 Transaction Date

All dates in this file are formatted in the same way dd/mm/yyyy. The transaction date is the date the transaction took place 1.6.5 Posting Date All dates in this file are formatted in the same way dd/mm/yyyy. The posting date is the date the transaction was processed by the Bank 1.6.6 Cardholder Name This is the cardholder surname and name as entered by the Card Administrator.

1.6.7 Cardholder Number

This is the cardholder number, masked by default 1.6.8 Employee ID

This is the employee ID as entered by the Card Administrator.

1.6.9 Structure Node Description

This describes the entity/structure node to which the cardholder is attached 1.6.10 Standard Reference Number This is a unique reference number assigned to the transaction when processed by the Bank.

This field is numeric and 23 characters in length 1.6.11 Line Item TAX Rate Description Where the supplier is TAX-capable (capable of passing line and TAX details) there will be an individual TAX rate description for each product purchased by the cardholder as part of that transaction. On set-up, the TAX rate description for the TAX rate of each relevant country is entered by the corporate. The TAX rate description is then automatically picked up by the D.CAL system.

1.6.12 Line Item TAX Rate

Where the supplier is TAX-capable (capable of passing line and TAX details) there will be an individual TAX rate for each product purchased by the cardholder as part of that transaction. The TAX rate and its relevant TAX rate description are automatically picked up by the D.CAL system.

1.6.13 Top Line Transaction TAX Rate Description

Where the supplier is Non-TAX-capable or the transaction is non-evidence for TAX, a TAX rate description is output only where it is manually applied to the transaction by the D.CAL user. Where no TAX rate description is applied, no TAX rate description is output.

1.6.14 Top Line Transaction TAX Rate

Where the supplier is Non-TAX-capable or the transaction is non-evidence for TAX, a TAX rate is output only where it is manually applied to the transaction by the D.CAL user. Where no TAX rate is applied, no TAX rate is output.

1.6.15 Line Item Billing Amount

This is the Vat inclusive amount of the line item.

1.6.16 Top Line Transaction Billing Amount

This is the Vat Inclusive amount of the top line transaction 1.6.17 Balancing Total The balancing total in the Line Item Detail line is the Tax-Exclusive Amount.

The balancing total in the Tax Detail line is the Tax Amount.

The balancing total in the Opposite Entry Detail line is the minus Billing Amount 1.6.18 Billing Currency Code This is the currency code of the card based on VISA's currency code listing—GBP, USD etc 1.6.19 Original Currency Code This is the currency code of the country in which the transaction takes place based on VISA's currency code listing 1.6.20 Billing Period End Date This is the last day of the current billing cycle to which the card belongs. Date format is as per all date formats dd/mm/yyyy 1.6.21 Export Period End Date This is the last day of the current export/GL period. Date format is as per all date formats dd/mm/yyyy.

1.6.22 Export Period Number

This is the export period to which the transaction belongs. Any transaction whose posting date falls within this period is assigned this period number.

1.6.23 CRC—Customer Reference Code

This is the reference quoted by the cardholder at the Point of Sale. This may be alpha-numeric and up to 16 characters in length 1.6.24 CAG—Cost Allocation Group This is the description of the Cost Allocation Group to which the cardholder has been attached.

This may be made up of one or multiple codes.

1.6.25 CACs 1 to 12
Each corporate can use up to 12 cost allocation levels. Where the corporate only uses 3 levels, for example Account Code, Cost Centre and Project Code, then only 3 levels will be output in this file. These codes will have been applied to each transaction automatically by D.CAL or manually by D.CAL users.

1.6.26 Split Y/N Flag
On D.CAL users may manually split transactions into multiple parts for cost allocation or TAX purposes. This flag is to indicate whether the relevant line in the export file has been split or not 1.6.27 MCC Description
This is the description of the VISA MCC (Merchant Category Code) of the transaction 1.6.28 Merchant Name
This is the Merchant's VISA name.
E.g. N B STATIONERY LTD 1.6.29 Merchant Account Number
This is the Merchant's unique VISA account number
E.g. 0019839002

1.6.30 Merchant Location
This is the Merchant's location.
E.g. HARLOW 1.6.31 TAX capable Flag
This flag is to indicate if the supplier is TAX capable or not. 1 indicates 'Yes', 0 indicates 'No'.

1.6.32 Evidence for TAX Flag
This flag is to indicate if the transaction is evidence or non-evidence for TAX based on the VISA TAX rules 1.6.33 Item or Commodity Description
This is the item description of each product purchased. This will only be available if the merchant is LID TAX capable. Each merchant has it's own unique set of item descriptions.
A LID merchant will output either item description OR commodity code description not both.
Commodity code descriptions are based on the VISA commodity code list.
SUMM TAX capable merchants will always pass a commodity code.
Non TAX capable merchants will not pass VISA commodity codes 1.6.34 Product Code
This is the product code of each product purchased. Each merchant has it's own unique set of product codes. Only LID merchants will pass product codes
SUMM and Non TAX capable merchants will not pass product codes 1.6.35 Quantity
This is the quantity of each product purchased. Only LID merchants will pass unit quantity SUMM and Non TAX capable merchants will not pass unit quantity 1.6.36 Unit Cost
This is the unit cost of each product purchased. Only LID merchants will pass unit cost
SUMM and Non TAX capable merchants will not pass unit cost 1.6.37 Discount
There may be discount on the top line transaction or on each line item or on both.
Both LID and SUMM merchants will pass discount amounts
Non TAX capable merchants will not pass discount amounts.

1.6.38 Export Date
All dates in this file are formatted in the same way dd/mm/yyyy. The export date is the date the export file is created 1.6.39 MCC Code
This is the VISA MCC (Merchant Category Code) of the transaction 1.6.40 Original Amount (Line Item)
This is the line item total amount plus the vat amount in the currency of origin 1.6.41 Original Amount (Top Line)
This is the original purchase amount in the currency of origin 1.6.42 Transaction Type
Is a code describing whether the transaction is a Purchase, Cash Advance, Fee or Payment 1.6.43 Commodity Code
The commodity code field is based on the VISA commodity code list.
A merchant assigns a generic code to describe one of his products.

1.6.44 Sequence Number
Gives the order of line items per transaction 1.6.45 Unit of Measure
Units measuring the quantity of product 1.6.46 Exchange Rate
This is the billing divided by the original amount 1.6.47 User Comment
The is a comment line added to a transaction or line item by the user using the D.CAL application 1.6.48 Line Item TAX Amount
Where the supplier is TAX-capable (capable of passing line and TAX details) there will be an individual TAX Amount for each product purchased by the cardholder as part of that transaction. This is calculated by the system based on the Tax Rate and line total.

1.6.49 Top Line TAX Amount
Where the supplier is Non-TAX-capable or the transaction is non-evidence for TAX, a TAX amount is output only where the TAX rate and description is manually applied to the transaction by the D.CAL user. Where no TAX rate is applied, no TAX amount is output 1.6.50 Line item TAX-Exclusive Amount
Where the supplier is TAX-capable (capable of passing line and TAX details) there will be an individual line item for each product purchased by the cardholder as part of that transaction.
All amount fields in the export file are 16 characters in length, have leading signs and are filled with zeros—+0000000000120.00.
A debit, credit and total column is output on each transaction. This gives the corporate the option of choosing the total or debit and credit columns 1.6.51 Top line Transaction TAX-Exclusive Amount
Where the supplier is Non-TAX-capable or the transaction is non-evidence for TAX, the TAX Exclusive amount is taken from the top line of the transaction.
If the D.CAL user does not apply TAX to the transaction prior to the export file being created, the TAX Exclusive Amount will output as the Billing Amount.

1.6.52 Split Description
This is the description of a split line as defined by the user on splitting a transaction top line.

1.6.53 Addendum Indicator
This is an indicator for addendum lines (S indicates a split line/L indicates a line item).

| | OPPOSITE ENTRY DETAIL | TRANSACTION | LENGTH | FORMAT |
|---|---|---|---|---|
| 1 | Record Identifier | Record Identifier | 1 | |
| 2 | Line Number | Line Number | 6 | 000001 |
| 3 | Document Run Number | Document Run Number | 6 | 000001 |
| 4 | Transaction Date | Transaction Date | 10 | Dd/mm/yyyy |
| 5 | Posting Date | Posting Date | 10 | Dd/mm/yyyy |
| 6 | Cardholder Name | Cardholder Name | 41 | |
| 7 | Card Number | Card Number | 19 | |
| 8 | Employee ID | Employee ID | 20 | |
| 9 | Structure node description | Structure node description | 40 | |
| 10 | Stan Reference | Stan Reference | 30 | |
| 11 | Line item TAX Rate Description | Transaction Rate Description | 40 | |
| 12 | Line item TAX Rate | Transaction Tax Rate | 5 | 99.99 |
| 13 | Billing Amount | Filler | 16 | +999999999999.99 |
| 14 | Balancing Total | Balancing Total | 16 | +999999999999.99 |
| 15 | Billing Currency Code | Billing Currency Code | 5 | GBP |
| 16 | Original Currency Code | Original Currency Code | 5 | GBP |
| 17 | Billing Period end date | Billing Period end date | 10 | Dd/mm/yyyy |
| 18 | Export Period end date | Export Period end date | 10 | Dd/mn/yyyy |
| 19 | Export Period Number | Export Period Number | 3 | 999 |
| 20 | CRC | CRC | 25 | |
| 21 | CAG | CAG | 40 | |
| 22-33 | Line item (CAC 1 to 12) | Top Line (CAC 1-12) | 240 | |
| 34 | Split Y/N flag | Split Y/N flag | 1 | |
| 35 | MCC description | MCC description | 40 | |
| 36 | Vendor Name | Vendor Name | 40 | |
| 37 | Vendor Merchant Account No | Vendor Merchant Account No | 16 | |
| 38 | Vendor Location | Vendor Location | 20 | |
| 39 | Non-Vat/Vat capable Flag | Non-Vat capable Flag | 1 | |
| 40 | Evidence/Non-Evidence Flag | Non-Evidence for VAT flag | 1 | |
| 41 | Commodity Description or Item Description | N/A | 26 | |
| 42 | Product Code | N/A | 12 | |
| 43 | Quantity | N/A | 10 | |
| 44 | Unit Cost | N/A | 10 | |
| 45 | Discount | N/A | 10 | +999999.99 |
| 46 | Export Date | Export Date | 10 | Dd/mm/yyyy |
| 47 | MCC Code | MCC Code | 4 | 9999 |
| 48 | Original Amount | Original Amount | 16 | +999999999999.99 |
| 49 | Transaction Type | Transaction Type | 3 | |
| 50 | Commodity Code | N/A | 4 | 0001 |
| 51 | Sequence Number | N/A | 3 | 001 |
| 52 | Unit of Measure | N/A | 12 | |
| 53 | Exchange Rate | Exchange Rate | 8 | +9999.99 |
| 54 | User Comment | User Comment | 40 | |
| 55 | Tax Amount | Tax Amount | 16 | +999999999999.99 |
| 56 | Tax Ex Amount | Tax Ex Amount | 16 | +999999999999.99 |
| 57 | Split Description | Split Description | 40 | |
| 58 | Addendum Indicator | Addendum Indicator | 1 | L or S |
| | Total Line length | | 958 | |

The Billing, TAX and TAX-Exclusive amount fields represent Total amounts on line items+transactions

1.7 Line Type 8: Opposite Entry Summary

The Opposite Entry Summary line produces a minus total of the billing amount on all transactions.

1.7.1 Record ID

Each line type is numbered. The Opposite Entry Summary line has a record ID of 4.

1.7.2 Line Number

Each line in the file is given a unique number in ascending sequence.

1.7.3 Structure Node description

This describes the entity/structure node to which the cardholder is attached

1.7.4 Billing Amount

This is the total Vat inclusive amount of all transactions (line item+top line TAX amounts) in the export file.

1.7.5 Balancing Total

The balancing total in the Opposite Entry Summary line is the minus total billing amount of transactions in the file

1.7.6 CACs 1-12

The Opposite Entry Summary line has a related Cost Allocation Code(s). As each company has a unique cost allocation code for the Opposite Entry Summary line, this must be keyed into the file manually after the file is created. By default the Cost Allocation Code fields will be OE_CODE_CAC1, OE_CODE_CAC2 etc 1.7.7 Export Date
All dates in this file are formatted in the same way dd/mm/yyyy. The export date is the date the export file is created 1.7.8 User Comment
The is a comment line added to a transaction or line item by the user using the D.CAL application 1.7.9 Billing Period End Date
This is the last day of the current billing cycle to which the card belongs. Date format is as per all date formats dd/mm/yyyy 1.7.10 Top Line Transaction and Line Item TAX-Exclusive Amount: TOTAL
Where the supplier is Non-TAX-capable or the transaction is non-evidence for TAX, the TAX Exclusive amount is taken from the top line of the transaction.
If the D.CAL user does not apply TAX to the transaction prior to the export file being created, the TAX Exclusive Amount will output as the Billing Amount.

1.7.11 Top line Transaction and Line Item Billing Amount: TOTAL
This is the Vat Inclusive amount of the top line transaction

| OPPOSITE ENTRY SUMMARY | Length | Properties |
| --- | --- | --- |
| 1. Record Identifier | 1 | |
| 2. Line Count | 6 | 000001 |
| 3. Structure node description | 40 | |
| 4. Billing Amount (signed) | 16 | +999999999999.99 |
| 5. Balancing Total | 16 | +999999999999.99 |
| 6-17 CACs 1-12 | 240 | |
| 18 Export Date | 10 | dd/mm/yyyy |
| 19 User Comment | 40 | |
| 20 Billing Period End Date | 10 | dd/mm/yyyy |
| 21 Tax Amount | 16 | +999999999999.99 |
| 22 Tax Ex Amount | 16 | +999999999999.99 |
| Total Line length | 411 | |

The Billing amount fields represent Total line item Billing amounts plus Total Transaction Billing amounts The User will be given the ability to add any number of text fields per line type specify the length of these text fields and place these text fields anywhere in the output sequence NOTE: Opposite Entry CACs will be hard-coded as text fields The User may use a field multiple times in any line type.
The User may switch off all fields in a line type, the effect of which will result in no line type being output.

1.8 Line Type 10: Trailer
Each export file ends with a file trailer. The file trailer summarises the export file output.

1.8.1 Record ID
Each line type is numbered. The File Trailer has a record ID of 5.

1.8.2 Line Number
Each line in the file is given a unique number in ascending sequence.

1.8.3 Export Run Number
The Export Run Number is a unique number in ascending order representing the file. The first export file to be run by the corporate will be assigned an Export Run Number of 000001. By default this number will increase by one each time a real export is run. The corporate has the option of increasing this number on test runs 1.8.4 Export Date
All dates in this file are formatted in the same way dd/mm/yyyy. The export date is the date the export file is created 1.8.5 Export Time
This is the time the export file is created. The time format is hh:mm:ss 1.8.6 Structure Node Description
This describes the entity/structure node from against which the export has been run 1.8.7 TAX Exclusive Amount
This is the total Vat Exclusive amount of all transactions (line item+top line TAX amounts) in the export file 1.8.8 TAX Amount
This is the total TAX amount of all transactions (line item+top line TAX amounts) in the export file.

1.8.9 Billing Amount
This is the total Vat inclusive amount of all transactions (line item+top line TAX amounts) in the export file 1.8.10 Total Number of Transactions
This is the total number of transaction in the file 1.8.11 Total Number of Debits
This the total number of debits in the file 1.8.12 Total Number of Credits
This the total number of credits in the file 1.8.12 Total Number of Lines
This the total amount of lines in the file (includes Header, Line item, VAT, Opposite Entry and Trailer lines)

1.8.13 Export Period Number
This is the export period to which the transaction belongs. Any transaction whose posting date falls within this period is assigned this period number.

1.8.14 Balancing Total
The balancing total is the total billing amount of transactions in the file 1.8.15 Total Amount of Debits
This the total amount of debits in the file 1.8.16 Total Amount of Credits
This the total amount of credits in the file 1.8.16 Billing Period End Date
This is the last day of the current billing cycle to which the card belongs. Date format is as per all date formats dd/mm/yyyy 1.8.17 Transaction Line Count
This the total amount of transaction lines in the file. The total number of lines in the file less the File Header and File Trailer lines.

| | FILE TRAILER | LENGTH | |
| --- | --- | --- | --- |
| 1 | Record Identifier | 1 | |
| 2 | Line Number | 6 | 000001 |
| 3 | Export Run Number | 6 | 000001 |
| 4 | Export date | 10 | dd/mm/yyyy |
| 5 | Time of export | 10 | hh:mm:ss |
| 6 | Structure node description | 40 | |
| 7 | TAX Exclusive Amount | 16 | +999999999999.99 |
| 8 | TAX Amount | 16 | +999999999999.99 |
| 9 | Billing Amount | 16 | +999999999999.99 |
| 10 | Total number of transactions | 10 | 1 |
| 11 | Total number of debits | 10 | 1 |
| 12 | Total number of credits | 10 | 1 |
| 13 | Total number of lines | 10 | 1 |
| 14 | Export Period Number | 3 | 001 |
| 15 | Balancing Total | 16 | +999999999999.99 |
| 16 | Total Amount of debits | 16 | +999999999999.99 |
| 17 | Total Amount of credits | 16 | +999999999999.99 |
| 18 | Billing Period End Date | 10 | dd/mm/yyyy |

| FILE TRAILER | | LENGTH | |
|---|---|---|---|
| 19 | Transaction Line Count | 10 | 0000000001 |
| | Total Line length | 232 | |

The Billing, TAX and TAX-Exclusive amount fields represent Total amounts on line items+tansactions The User will be given the ability to add any number of text fields per line type specify the length of these text fields and place these text fields anywhere in the output sequence The User may use a field multiple times in any line type The User may switch off all fields in a line type, the effect of which will result in no line type being output

What is claimed is:

1. A method for exporting data in a database into a format acceptable by another application, said method comprising:
   inputting data into said data base including a plurality of line types, wherein said line types are included in an export format, and wherein each of said plurality of line types is associated with a plurality of export fields, each of said plurality of export fields representing a data field in said database;
   processing at least some of said data to create an export format, and selectively including at least one of said plurality of line types into said export format; and
   for each line type included in said export format, including at least one of said associated export fields into said export format, including providing field length and position for each included export field;
   performing an export operation from said database, using said export format to define a format for data exported from said database.

2. The method of claim 1 further including:
   performing said export operation from said database, using said export format to define said format for data exported from said database directly to a selected general ledger program.

3. The method of claim 1 wherein said plurality of line types include restrictions affecting a sequential ordering of said plurality of line types included in said created export format.

4. The method of claim 1 wherein said plurality of line types include mutually exclusive line types.

5. The method of claim 1 wherein said plurality of line types include restrictions preventing inclusion a particular one of said plurality of line types in said created export format, if another different one of said plurality of line types is included in said created export format.

6. The method of claim 1 wherein said data is credit card transaction data.

7. The method of claim 1 wherein said at least one export fields includes an ability to accept global settings for certain properties, or have other settings for said certain properties that are different than said global settings.

8. The method of claim 1 wherein said plurality of line types are selected from the group of File Header, Transaction Header, Transactions—Top Line, Transactions—Line Item, Tax Detail, Tax Summary, Opposite Entry Detail, Opposite Entry Summary, and File Trailer.

9. The method of claim 8 wherein said export format includes one or the other of either a line type of Transactions—Top Line, or a line type of Transactions—Line Item.

10. The method of claim 8 wherein said export format includes one or the other of either a line type of Tax Detail, or a line type of Tax Summary.

11. The method of claim 8 wherein said export format includes one or the other of either a line type of Opposite Entry Detail, or a line type of Opposite Entry Summary.

12. A system for processing data into a format acceptable by another application, said system comprising:
   an export format, said export format defining a format for exporting data from a database, said export format including at least one line type, wherein each of said at least one line type being associated with a plurality of export fields, each of said plurality of export fields representing a reference to a data field in said database;
   a user interface component, to provide a user with an ability to create and modify said export format, including the ability to selectively include said at least one line type into said export format, and for said included line type the ability to select at least one export field;
   wherein said system uses said export format to export data from said database in a format defined by said included line type and said at least one selected export field.

13. The system of claim 12 wherein said system performs an export operation from said database, using said export format to define said format for data exported from said database directly to a selected general ledger program.

14. The system of claim 12 wherein said at least one line type includes restrictions affecting a sequential ordering of said at least one line type included in said created export format.

15. The system of claim 12 wherein said at least one line type is more than one line type and includes mutually exclusive line types.

16. The system of claim 12 wherein said at least one line type includes restrictions preventing inclusion of a particular one of said at least one line type in said export format, if another different one of said at least one line type is included in said export format.

17. The method of claim 12 wherein said data is credit card transaction data.

18. The method of claim 12 wherein said at least one export field includes an ability to accept global settings for certain properties, or have other settings for said certain properties that are different than said global settings.

19. The method of claim 12 wherein said at least one line type is selected from the group of File Header, Transaction Header, Transactions—Top Line, Transactions—Line Item, Tax Detail, Tax Summary, Opposite Entry Detail, Opposite Entry Summary, and File Trailer.

* * * * *